(No Model.)
G. RUMPF.
MANUFACTURE OF CHLOROFORM FROM ACETONE.
No. 383,992. Patented June 5, 1888.
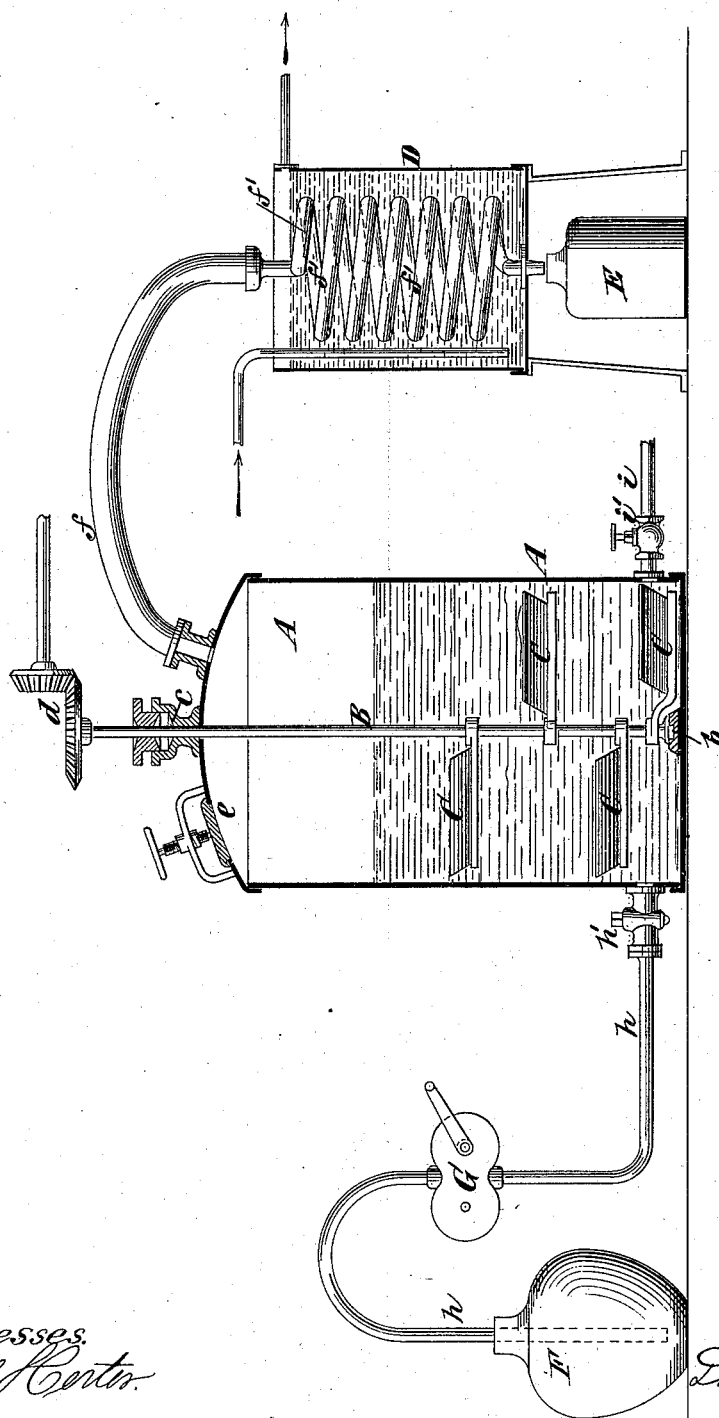
Witnesses.
Inventor.

UNITED STATES PATENT OFFICE.

GUSTAV RUMPF, OF FRANKFORT-ON-THE-MAIN, GERMANY, ASSIGNOR TO FRANZ ROESSLER AND JACOB HASSLACHER, OF NEW YORK, N. Y.

MANUFACTURE OF CHLOROFORM FROM ACETONE.

SPECIFICATION forming part of Letters Patent No. 383,992, dated June 5, 1888.

Application filed June 23, 1886. Serial No. 205,972. (No model.)

*To all whom it may concern:*

Be it known that I, GUSTAV RUMPF, a subject of the Emperor of Germany, residing at Frankfort-on-the-Main, Germany, have invented a new and useful Improvement in the Manufacture of Chloroform from Acetone, of which the following is a specification.

The essential feature of this invention is based on the discovery that acetone when treated in the proper way with a hypochlorite—for example, chloride of lime—will yield a larger quantity of chloroform than has been heretofore known.

Watts, in his Dictionary of Chemistry, edition of 1883, volume 1, page 918, says that the manufacture of chloroform from acetone cannot usefully be carried out, not only because the price of acetone is too high, but particularly because acetone yields only about thirty-three per cent. of its own weight of chloroform when it is treated with chloride of lime. Watts distilled thirty grams of acetone with one hundred and fifty grams of chloride of lime and rectified the watery distillate with forty grams of chloride of lime. I have discovered a method whereby it is possible to obtain a yield of chloroform from acetone very much greater than that obtained by Watts. I have found that the reaction may be made to take place in such a way that one equivalent of acetone will yield one equivalent of chloroform by volumn, or about one hundred and eighty per cent., by weight, and the advantages of my invention may be secured in a greater or less degree by properly employing with about fifty-eight pounds of acetone more than three hundred pounds of good chloride of lime. The best results and greatest yield of chloroform can, as I have found, be obtained by the use of, say, fifty-eight pounds of acetone to at least six hundred pounds of a good chloride of lime containing about thirty-five per cent. of available chlorine, and in proportion if the chloride of lime is poorer. The yield of chloroform will then be from one hundred and fifty per cent. to one hundred and eighty per cent. of the weight of the acetone employed instead of about thirty-three per cent.

Another feature of the invention is based on the discovery that acetone when not diluted with water and mixed with chloride of lime without certain precautions will not perfectly combine with the chlorine, and will partly distill without being decomposed. I therefore introduce the acetone in a dilute state into a solution of chloride of lime in water which may be agitated with a stirrer, and I do not introduce the whole quantity of acetone at once; but in order to avoid introducing the acetone faster than it can combine with the chlorine of the chloride of-lime solution, I find it advantageous to introduce it periodically, or from time to time during the process, according to the proceeding of the reaction. I also find it advantageous to introduce the dilute acetone into the lower part of the still or at a point below the surface of the solution in the still, and the still may then have no other outlet for the vapors but to the condensing-worm. When the acetone is introduced at a point below the surface of the solution, the acetone will be compelled by its lesser specific gravity to ascend through the chloride-of-lime solution, and will thus be brought into intimate contact with the chlorine of the solution.

The advantage of diluting the acetone is due to the fact that it will then be disseminated more extensively through the chloride-of-lime solution, so as to be more certain to combine with the chlorine of the chloride-of-lime solution.

In the accompanying drawing I have shown in sectional elevation a simple form of apparatus for carrying out my invention.

A designates a closed vessel or still, which may be made of metal plates, and in which is an upright shaft, B, having stirrer blades or agitators C secured to it at intervals in its height. This shaft may rest in a step-bearing, *b*, at the bottom of the vessel, and passes through a stuffing-box, *c*, at the top of the vessel. It may be driven by any outside mechanism—as, for example, by bevel gear-wheels *d*. The vessel may be provided with a man-hole, *e*, closed by a suitable cover, through which access may be had for cleaning out the vessel, and through which the chloride of lime may be introduced. The vapors of chloroform pass from the vessel or still through a pipe, *f*, which leads to a condensing worm or coil, $f'$, immersed in a cold-water bath, D, and from the bottom of this coil chloroform may be received in a jar or receptacle, E.

F designates a carboy or vessel from which the dilute acetone may be taken through a pipe, $h$, and delivered into the vessel or still A, at or near the bottom thereof, or at a point below the surface of the solution under control of a cock or valve, $h'$. This dilute acetone may be composed of from one to two pounds of water to each pound of acetone.

I have also shown a pump, G, which may be employed for delivering the acetone through the pipe $h$, in order to overcome the pressure due to the height of liquid within the vessel or still A. If the carboy or vessel from which the acetone is taken were arranged above the vessel or still A, and a siphon were employed leading from the vessel F to the still A, the pump G would not be necessary. If the pump be employed, a simple rotary pump of well-known construction will answer the purpose.

I have also shown the vessel or still A as provided with a pipe, $i$, in which is a valve, $i'$, for introducing steam into the contents of the vessel or still to facilitate the reaction.

A proper quantity of chloride-of-lime solution having been placed in the still, a proper supply of acetone is introduced through the pipe $h$ and the stirrers or agitators C are set in operation. A proper supply of acetone may be secured by admitting acetone periodically in small quantities. Care should be exercised to keep up the supply in such a way that all the acetone will be certain to combine with the chlorine of the chloride-of-lime solution. The stirrers or agitators C are agitated to cause a thorough commingling of the acetone and the chloride of-lime solution, and the stirrers or agitators are shown as inclined the better to effect this purpose. As the reaction continues acetone in quantities, as experience may determine, is introduced and the process is continued until the reaction is complete. During the principal portion of the time required for reaction steam need not be introduced into the vessel or still through the pipe $i$, as sufficient heat is produced within the vessel by the chemical reaction. After the principal portion of the chloroform has been given off and the reaction has become less active, steam may be introduced through the pipe $i$ to raise the temperature of the vessel or still A, and thus complete the reaction, and the free steam introduced into the vessel or still A also serves to drive off the chloroform which is in the watery solution. Up to the time of introducing steam uniformity of temperature is advantageous, in that it conduces to prevent any of the acetone from passing off without combining with the chlorine of the chloride-of-lime solution. After the reaction is complete and substantially all the chloroform has been given off from the contents of the vessel or still A, the lime remaining therein should be discharged, and an ordinary outlet-cock may be provided at the bottom of the vessel or still for the discharge of the spent lime after each operation.

What I claim as my invention, and desire to secure by Letters Patent, is—

1. The improvement in the method of making chloroform, consisting in adding acetone to chloride-of-lime solution in such quantities that the chloride of lime employed shall be more than five times the weight of the acetone employed, substantially as herein described.

2. The improvement in the method of making chloroform, consisting in introducing acetone into a chloride-of-lime solution and in maintaining as nearly as possible a uniform temperature until the chloroform has been produced by the reaction, substantially as herein described.

3. The improvement in the method of making chloroform, consisting in introducing acetone into a chloride-of-lime solution, and in meanwhile stirring or agitating the solution to promote the thorough combination of the acetone with the chlorine of the solution, substantially as herein described.

4. The improvement in the method of making chloroform, consisting in introducing acetone in a dilute state into the chloride-of-lime solution, substantially as herein described.

5. The improvement in the method of making chloroform, consisting in introducing acetone into a vessel or still containing chloride-of-lime solution at a point below the surface of the chloride-of-lime solution, substantially as herein described.

6. The improvement in the method of making chloroform, consisting in introducing the acetone in a dilute state into a still containing chloride-of-lime solution and at a point below the surface of the chloride-of-lime solution, substantially as herein described.

7. The improvement in the method of making chloroform, consisting in introducing the acetone periodically or at intervals of time during the operation into the still containing the chloride-of-lime solution and at a point below the surface of such solution, substantially as herein described.

8. The improvement in the method of making chloroform, consisting in introducing the acetone in a dilute state periodically or at intervals of time during the operation into a still containing chloride-of-lime solution and at a point below the surface of the chloride-of-lime solution, substantially as herein described.

GUSTAV RUMPF.

Witnesses:
C. HALL,
FREDK. HAYNES.